(12) United States Patent  (10) Patent No.: US 8,917,423 B2
Kurakata et al.  (45) Date of Patent: Dec. 23, 2014

(54) IMAGE SCANNER, AUTO DOCUMENT FEEDER, AND IMAGE FORMING APPARATUS

(71) Applicants: Takahiro Kurakata, Kanagawa (JP); Ayako Ikeda, Kanagawa (JP)

(72) Inventors: Takahiro Kurakata, Kanagawa (JP); Ayako Ikeda, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 27 days.

(21) Appl. No.: 13/713,177

(22) Filed: Dec. 13, 2012

(65) Prior Publication Data

US 2013/0170000 A1    Jul. 4, 2013

(30) Foreign Application Priority Data

Dec. 28, 2011  (JP) .................. 2011-289694

(51) Int. Cl.
*H04N 1/40* (2006.01)
*H04N 1/407* (2006.01)
*H04N 1/04* (2006.01)

(52) U.S. Cl.
CPC ............. *H04N 1/04* (2013.01); *H04N 1/407* (2013.01); *H04N 1/40025* (2013.01)
USPC .......................... 358/2.1; 358/475

(58) Field of Classification Search
USPC ........... 358/461, 474–475, 509, 448, 2.1, 1.9, 358/445
See application file for complete search history.

(56) References Cited

U.S. PATENT DOCUMENTS

| 8,537,407 B2* | 9/2013 | Okamoto ............... 358/1.17 |
| 2012/0013955 A1 | 1/2012 | Ikeda |
| 2012/0162729 A1 | 6/2012 | Kurakata |

FOREIGN PATENT DOCUMENTS

| JP | 2002-300394 | 10/2002 |
| JP | 2006-013852 | 1/2006 |

* cited by examiner

*Primary Examiner* — Thomas D Lee
*Assistant Examiner* — Stephen M Brinich
(74) *Attorney, Agent, or Firm* — Harness, Dickey & Pierce, P.L.C.

(57) ABSTRACT

An image scanner includes: an image sensor that photo-electrically converts reflected light from a document irradiated with light by a light source; an A/D converter that converts an analog image signal output from the image sensor into a digital signal; a lighting control unit that adjusts, in a period other than a document scanning period, a lighting period of the light source so that the light source is turned on and off alternately in a repetitive manner in units of a line cycle; a black correction unit that generates reference black data used for black correction based on effective pixel data in a light source non-lighting period in the period other than the document scanning period; and a white correction unit that generates shading data used for shading correction based on effective pixel data in a light source lighting period in the period other than the document scanning period.

16 Claims, 11 Drawing Sheets

IMAGE SCANNER, AUTO DOCUMENT FEEDER, AND IMAGE FORMING APPARATUS

CROSS-REFERENCE TO RELATED APPLICATIONS

The present application claims priority to and incorporates by reference the entire contents of Japanese Patent Application No. 2011-289694 filed in Japan on Dec. 28, 2011.

BACKGROUND OF THE INVENTION

1. Field of the Invention

The present invention relates to an image scanner, an auto document feeder, and an image forming apparatus.

2. Description of the Related Art

Conventionally, in order to correct, in an image scanner, influence on image data by a light source or a scanning optical system that illuminates a document, and determine a reference white level, there is generally performed shading correction using a scanned result (hereinafter referred to as shading data) of a density reference member having a given white color. The light amount of the light source decreases with time, and thus it is preferable to obtain shading data for each time performing image scanning.

However, when shading correction is performed for each time performing image scanning, the productivity is deteriorated because a period for generating shading data is required. In particular, when a white reference member scanning position is different from a document data scanning position in the sub-scanning direction, a process of moving a carriage is added, which significantly reduces production efficiency.

With such a background, there is proposed recently a technique to shorten paper interval time in a manner such that, at a document scanning position, not only a document but also a density reference member are scanned at the same time, the degree of decrease in light amount (correction factor) is calculated based on the comparison between the result of scanning the density reference member and the past result of scanning the density reference member, and the result of the correction using shading data is further corrected.

For example, Japanese Patent Application Laid-open No. 2006-13852 proposes a technique in which, in order to shorten shading data generation time in a paper interval, a light amount is corrected based on result of comparison among a plurality of positions of a facing member facing a scanned face and regarding a light amount reference value and a light amount variation that are obtained at the same position among the plurality of positions.

However, in the conventional configuration, when an image sensor (contact image sensor (CIS), for example) that does not include a pixel with its light-receiving portion shielded to detect output in darkness (optical black (OPB) pixel) is used, it is necessary to generate a reference black level after a light source is turned off once, thus making it difficult to significantly shorten paper interval time.

In an image sensor that includes no OPB pixel, it is necessary to turn off a light source once so as to regenerate reference black level data for black correction. Thus, the following two measures can be considered: (1) in order to shorten paper interval time, a light source is not turned off in each paper interval, and a black level generated when a job is started continues to be used; and (2) in order to maintain image quality, a light source is turned off in each paper interval or each specified number of paper intervals to regenerate a black level. However, these measures involve the following problems.

(1) In the case of a configuration in which a light source is not turned off in paper intervals:

A light source is continuously on until a job is finished, and thus heat generated by the light source increases a temperature of a sensor substrate. Consequently, due to difference in temperature characteristics between sensor chips, difference in an increased amount of a dark current (an increased amount of a reference black level) arises, which causes level difference between chips in a final scanned image.

(2) In the case of a configuration in which a light source is tuned off in a paper interval:

Even if one job takes long time and a temperature of a sensor substrate is increased, density difference between chips due to variation of a black level dose not arise in a scanned image when a reference black level is regenerated in each paper interval. However, this configuration requires turning off a light source; regenerating a black level; turning on a light source; and securing light amount stabilization time after a light source is turned on again. Therefore, there is a problem in time saving in this case. In particular, light amount stabilization time after a light source is turned on again is based on temperature characteristics of a light source. When the latest light source non-lighting time is long, a temperature of the light source is decreased, and thus necessary light amount stabilization time is increased (when the latest light source non-lighting time is short, by contrast, the decrease of a temperature of the light source is small, and thus light amount stabilization time after the light source is turned on again can be shortened).

In view of the above aspects, there is a need to shorten paper interval time while generating reference black data in a paper interval in an image scanner using an image sensor that does not include a pixel with light-receiving portion shielded (OPB pixels).

SUMMARY OF THE INVENTION

It is an object of the present invention to at least partially solve the problems in the conventional technology.

An image scanner includes: a light source that irradiates a document with light; an image sensor that photo-electrically converts reflected light from the document irradiated with light by the light source; an A/D converter that converts an analog image signal output from the image sensor into a digital signal to output the digital signal; a lighting control unit that adjusts, in a period other than a document scanning period, a lighting period of the light source so that the light source is turned on and off alternately in a repetitive manner in units of a line cycle; a black correction unit that generates reference black data used for black correction based on effective pixel data in a light source non-lighting period in the period other than the document scanning period; and a white correction unit that generates shading data used for shading correction based on effective pixel data in a light source lighting period in the period other than the document scanning period.

An auto document feeder includes an image scanner as described above.

An image forming apparatus includes an image scanner as described above.

The above and other objects, features, advantages and technical and industrial significance of this invention will be better understood by reading the following detailed descrip-

DETAILED DESCRIPTION OF THE PREFERRED EMBODIMENTS

In the following, an embodiment of an image scanner and an image forming apparatus of the present invention is described in detail with reference to the enclosed drawings.

Figure 1:
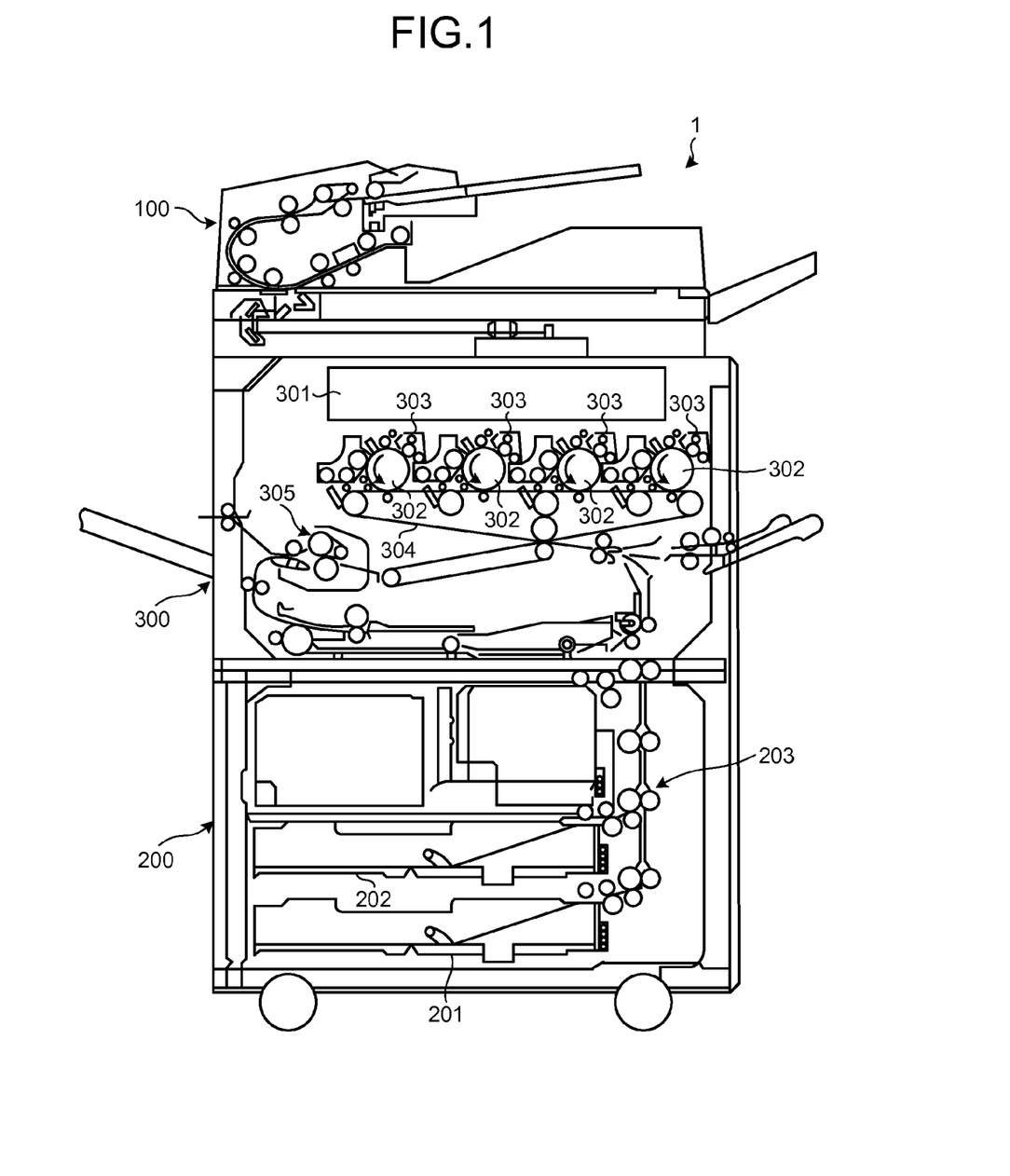
FIG. 1 is a diagram illustrating a schematic configuration of a copying machine as an image forming apparatus provided with an auto document feeder (ADF) having a function of an image scanner of an embodiment of the present invention.

FIG. 1 is a diagram illustrating a schematic configuration of a copying machine as an image forming apparatus provided with an auto document feeder having a function of an image scanner of the present embodiment.

As illustrated in FIG. 1, a copying machine 1 has an ADF 100 having a function of an image scanner, a paper feeding unit 200, and an image forming unit 300.

The paper feeding unit 200 has paper cassettes 201 and 202 that store recording sheets with different paper sizes, and a feeding unit 203 including various rollers conveying the recoding sheets stored in the paper cassettes 201 and 202 to an image forming position of the image forming unit 300.

The image forming unit 300 has an exposing device 301, photosensitive drums 302, developing devices 303, a transfer belt 304, and a fixing device 305. In the image forming unit 300, the exposing device 301 exposes the photosensitive drums 302 to form latent images on the photosensitive drums 302, based on image data of a document scanned by a scanning unit (described later) that scans a document image, and the developing devices 303 supply the photosensitive drums 302 with different colors of toner to develop the latent images. Subsequently, in the image forming unit 300, the developed images on the photosensitive drums 302 are transferred, with the transfer belt 304, onto a recording sheet supplied from the paper feeding unit 200, and then the fixing device 305 melts toner of the toner image transferred onto the recording sheet to fix the color image onto the recording sheet.

Figure 2:
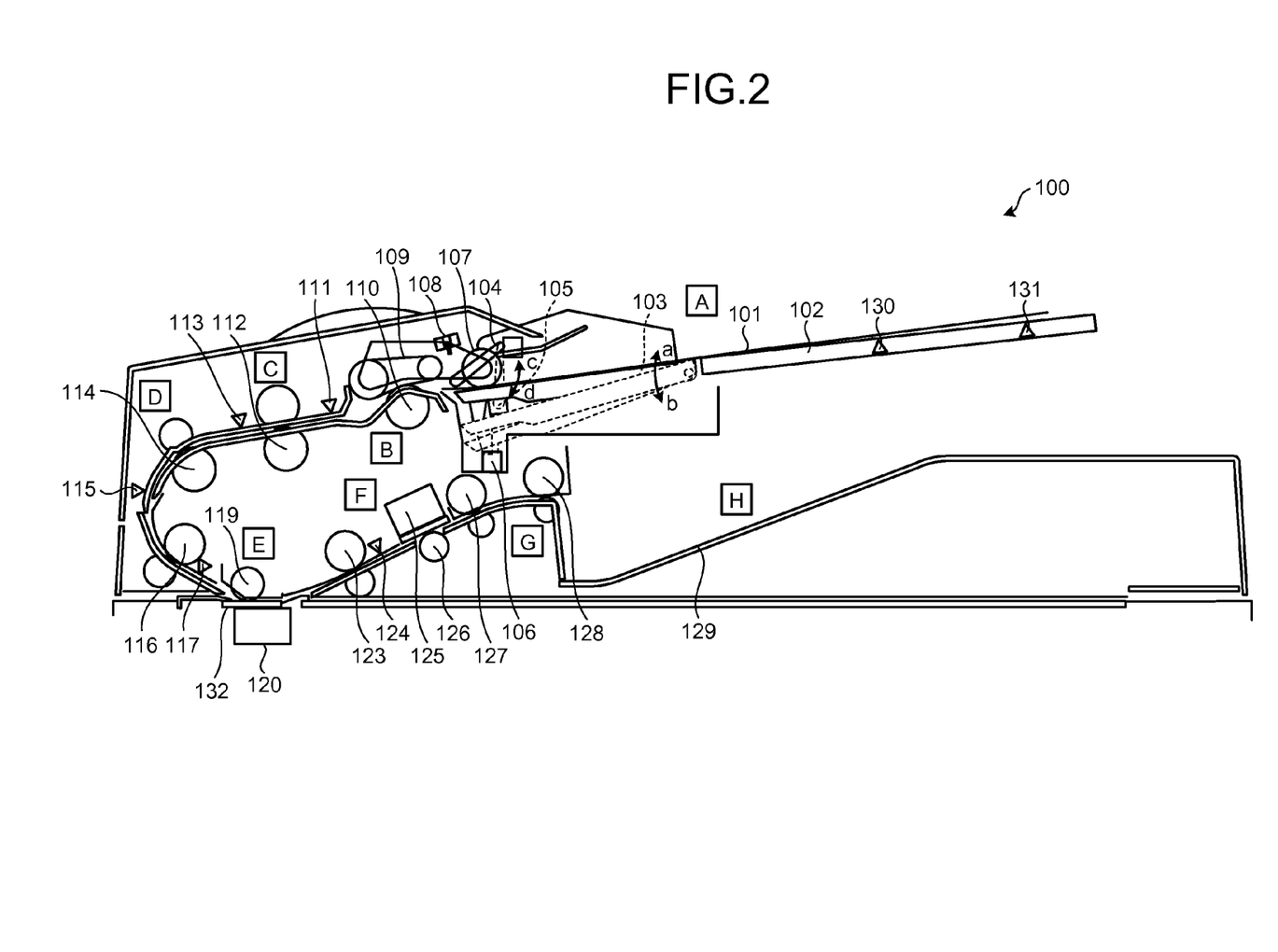
FIG. 2 is a section view illustrating a configuration example of a mechanical system of the ADF of the embodiment.

The configuration example of the ADF 100 illustrated in FIG. 2 is of an auto document feeder that has a function of an image scanner that conveys a scan target document to a fixed scanning device part, and scans images while conveying the scan target document at a given speed. In the following, the fundamental configuration, operation, and effects are described based on FIG. 2, which is a section view of the ADF 100, and FIG. 3, which is a block diagram illustrating a configuration example of a control system of the ADF 100.

Figure 3:
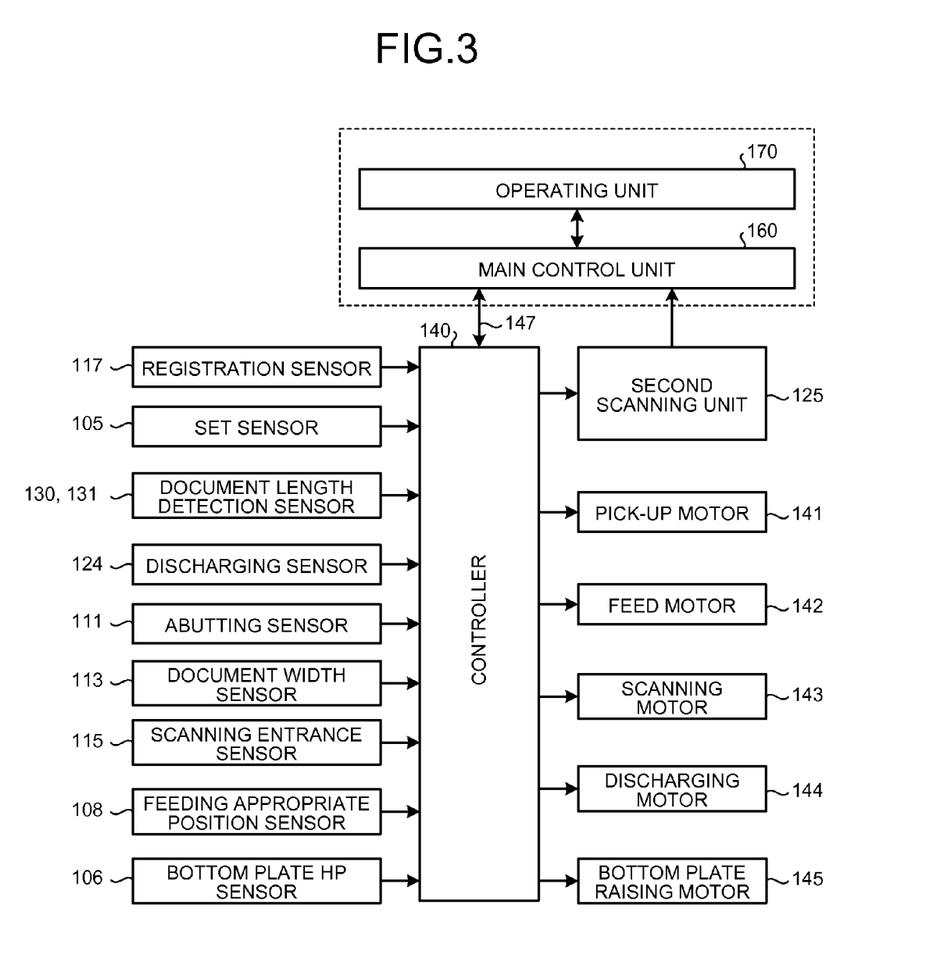
FIG. 3 is a block diagram illustrating a configuration example of a control system of the ADF of the embodiment.

As illustrated in FIG. 2, the ADF 100 includes a document setting section A to set a document bundle to be scanned, a separate feeding section B to separate documents one by one from the set document bundle and conveying them, a registration section C having a function of first abutting adjustment of the conveyed document and a function of drawing and conveying the adjusted document, a turn section D to turn the conveyed document to convey them with a document face facing the scan side (downward), a first scan conveying section E to scan an image on the front surface of the document from the under portion of an exposure glass, a second scan conveying section F to scan an image on the back surface of the scanned document, a discharging section G to discharge the document with its front surface and back surface scanned to the outside of the ADF 100, and a stack section H to store the scanned document in a stacked manner. The ADF 100 includes, in addition to these sections, various motors 141 to 145 as driving units that drive conveying operation by these sections, and a controller 140 to control a series of operation of these sections, as illustrated in FIG. 3.

A document bundle 101 to be scanned is set on a document table 102 including a movable document table 103 so that a document face is upward. Moreover, positioning of the document bundle 101 in a direction orthogonal to a conveying direction is performed by a side guide (not shown). The document bundle 101 is set is detected by a set feeler 104 and a set sensor 105, and the detection result is notified to a main control unit 160 through an interface (I/F) 147.

Furthermore, a document length detection sensor 130 or 131 (a reflection-type sensor, or an actuator-type sensor capable of detecting even one piece of document is used) that is provided on the document table face determines a rough length in a conveying direction of the document (the sensor is arranged so as to determine, at least, whether documents with the same size are set in a landscape orientation or a portrait orientation).

The movable document table 103 is configured to be movable up and down in an a-b direction illustrated in FIG. 2 by a bottom plate raising motor 145. Once the set feeler 104 and the set sensor 105 detect that the document bundle 101 is set, the controller 140 controls the bottom plate raising motor 145 to rotate normally so that the movable document table 103 is moved upward and the uppermost face of the document bundle 101 comes into contact with a pick-up roller 107. The pick-up roller 107 is moved in a c-d direction illustrated in FIG. 2 via a cam mechanism by a pick-up motor 141. In addition, when the movable document table 103 moves upward, the pick-up roller 107 can be moved upward in a c direction by pressing by the upper face of the document bundle 101 on the movable document table 103 and a table feeding appropriate position sensor 108 can detect the upper limit. Note that a bottom plate HP sensor 106 detects a position of the movable document table 103.

When a user presses a print key on an operating unit 170, and the main control unit 160 transmits, through the I/F 147, a document feeding signal to the controller 140, which is a control unit of the ADF 100, a roller of the pick-up roller 107 is driven to rotate by normal rotation of a feed motor 142, and the pick-up roller 107 picks up a few pieces (ideally one piece) of documents on the document table 102. Note that a rotation direction of the feed motor 142 is a direction in which the uppermost piece of document is conveyed to a paper feeding port.

A paper feeding belt 109 is driven in a paper feeding direction by normal rotation of the feed motor 142, while a reverse roller 110 is driven in a direction reverse of the paper feeding direction by normal rotation of the feed motor 142. Thus, the uppermost piece of document can be separated from a piece of document positioned under the uppermost piece in the document bundle 101, and fed individually. To be more specific, the reverse roller 110 is brought into contact with the paper feeding belt 109 with a given pressure, and when the reverse roller 110 is in contact with the paper feeding belt 109 directly or via one piece of document interposed therebetween, the reverse roller 110 is co-rotated in a counterclockwise direction following the rotation of the paper feeding belt 109. When two or more pieces of documents are inserted between the paper feeding belt 109 and the reverse roller 110, the reverse roller 110 rotates in a clockwise direction, which is an original drive direction, the reverse roller 110 is configured such that a co-rotation force when two or more pieces of documents are inserted between the paper feeding belt 109 generates a torque lower than that limited by a torque limiter and thus pushes back extra pieces of documents, preventing multi feed.

The piece of document individually separated by the action of the paper feeding belt 109 and the reverse roller 110 is further conveyed by the paper feeding belt 109. After the leading end of the document is detected by an abutting sensor 111, the document is conveyed further and brought into abutment with a pull-out roller 112 that is stopped. Thereafter, the document is conveyed by a predetermined distance from the detected position by the abutting sensor 111, and the drive of the paper feeding belt 109 is stopped by stopping the feed motor 142 in a state that the document is pressed against the pull-out roller 112 to produce a given amount of bending. Here, the pick-up motor 141 is rotated so that the pick-up roller 107 is set back from the document upper face, and the document is conveyed with only a conveying force of the paper feeding belt 109, so that the leading end of the document enters a nip formed by a pair of upper and lower rollers of the pull-out roller 112, and adjustment of the leading end (skew correction) is performed.

The pull-out roller 112 has a function of the skew collection, and a function of conveying the document having been subjected to the skew correction to an intermediate roller 114. The pull-out roller 112 is driven by reverse rotation of the feed motor 142. When the feed motor 142 is rotated reversely, the pull-out roller 112 and the intermediate roller 114 are driven, while the pick-up roller 107 and the paper feeding belt 109 are not driven.

A plurality of document width sensors 113 are arranged in a depth direction, and detect a size of the document conveyed by the pull-out roller 112, in a width direction orthogonal to a conveying direction. The length of a document in a conveying direction is detected based on motor pulses and detection of the leading end and the trailing end of the document by the abutting sensor 111.

When a document is conveyed from the registration section C to the turn section D by the drive of the pull-out roller 112 and the intermediate roller 114, a conveying speed in the registration section C is set to be higher than that in the first scan conveying section E so as to shorten processing time to convey the document into a first scanning unit 120. Once a scanning entrance sensor 115 detects the leading end of the document, a document conveying speed starts to be reduced to become the same as a scan conveying speed before the leading end of the document enters a nip formed by a pair of upper and lower rollers of a scanning entrance roller 116. At the same time, a scanning motor 143 is driven to rotate normally to drive the scanning entrance roller 116, a scanning exit roller 123, and a contact image sensor (CIS) exit roller 127. Once a registration sensor 117 detects the leading end of the document, the document conveying speed is reduced over a given conveying distance. Then, the document is stopped once before the first scanning unit 120, and a registration stop signal is transmitted to the main control unit 160 through the I/F 147.

Subsequently, once the controller 140 receives a scanning start signal from the controller 140, the document that is registration-stopped is conveyed, under the control of the controller 140, so that a speed of the document reaches a given conveying speed by the time at which the leading end of the document reaches a scanning position. From the timing at which the leading end of the document reaches the first scanning unit 120 and which is determined based on pulse counts of the scanning motor 143, the controller 140 transmits a gate signal indicating an effective image range in a sub-scanning direction of a first face to the first scanning unit 120 until the trailing end of the document passes through the first scanning unit 120. In accordance with the gate signal, the first scanning unit 120 scans the document from the lower side of an exposure glass 132. The image data scanned by the first scanning unit 120 is subjected to given image processing by an image processing unit 151 of a digital signal processing unit 150, and transmitted to the main control unit 160. A first scanning roller 119 prevents floating of the document in the first scanning unit 120.

In the case of scanning of a single sided document, the document passing through the first scan conveying section E is conveyed to the discharging section G through a second scanning unit 125. Here, once a discharging sensor 124 detects the leading end of the document, a discharging motor 144 is driven to rotate normally, so that a discharging roller 128 is rotated in a counterclockwise direction. Based on discharging motor pulse counts from the detection of the leading end of the document by the discharging sensor 124, a discharging motor drive speed is reduced immediately before the trailing end of the document leaves a nip formed by a pair of upper and lower rollers of the discharging roller 128, to perform control in such a manner that the document will not fly out when it is discharged on a discharge tray 129.

In the case of scanning of a double sided document, at the timing at which the leading end of the document reaches the second scanning unit 125 and which is determined from pulse counts of the scanning motor 143 after the detection of the leading end of the document by the discharging sensor 124, the controller 140 transmits a gate signal indicating an effective image range in the sub-scanning direction to the second scanning unit 125 until the trailing end of the document leaves the second scanning unit 125. In accordance with this gate signal, the second scanning unit 125 scans the back face of the document face scanned by the first scanning unit 120. The image data of the document scanned by the second scanning unit 125 is subjected to given image processing (described later) by the image processing unit 151 of the digital signal processing unit 150, and transmitted to the main control unit 160. A second scanning roller 126 prevents floating of the document in the second scanning unit 125, and serves as a reference white portion to obtain shading data in the second scanning unit 125.

Figure 4:
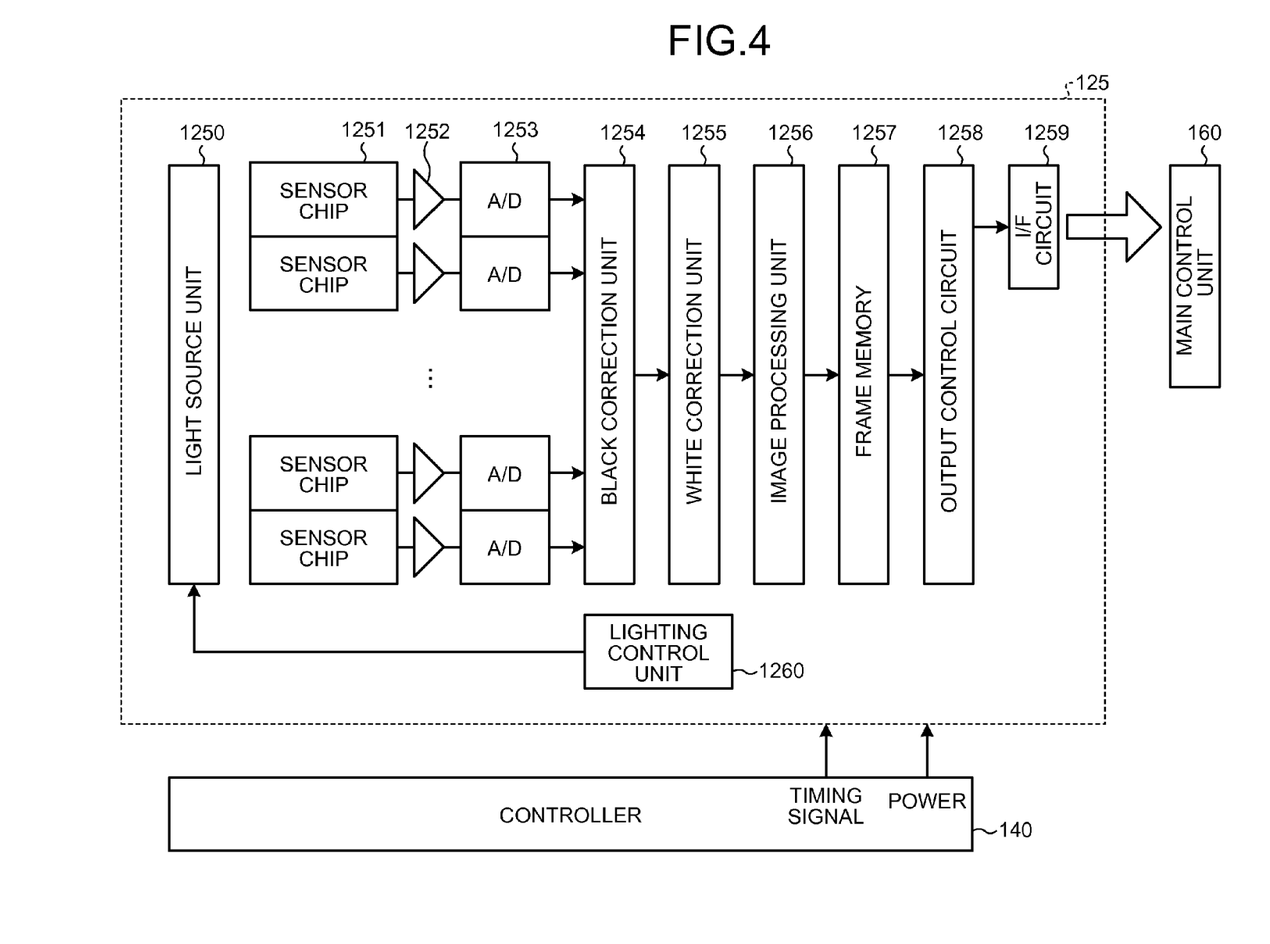
FIG. 4 is a block diagram illustrating a main portion of an electrical circuit in a second scanning unit.

Next, a main portion of an electrical circuit of the second scanning unit 125 in the ADF 100 is described. FIG. 4 is a block diagram illustrating a main portion of an electrical circuit in the second scanning unit 125.

As illustrated in FIG. 4, the second scanning unit 125 has a light source unit 1250 including a light-emitting diode (LED), a fluorescent light, or a cold-cathode tube. The second scanning unit 125 also has a plurality of sensor chips 1251 arranged in a main-scanning direction (direction corresponding to a document width direction), a plurality of amplifier circuits 1252 individually connected to the respective sensor chips 1251, and a plurality of analog-to-digital (A/D) converters 1253 individually connected to the respective amplifier circuits 1252. The output signal of each of the A/D converters 1253 includes not only a signal component but also a black level offset, and thus the second scanning unit 125 has a black correction unit 1254 to remove the black level offset. It is general that the output signal of the black correction unit 1254 is subjected to shading correction to remove influence on image data by unevenness of a light source, or unevenness of sensor sensitivity. Thus, the second scanning unit 125 also has a white correction unit 1255 for such shading correction. In addition, the second scanning unit 125 has an image processing unit 1256 performing given image processing, a frame memory 1257, an output control circuit 1258, an interface (I/F) circuit 1259, etc. The white correction unit 1255 has a function of averaging generated shading data for each of groups of pixels set arbitrarily and calculating the maximum value thereof to calculate variation of light amount.

Each of the sensor chips 1251 is what is called an equal magnification contact image sensor including a photoelectric conversion element and a condenser lens. Before a document (not shown) is introduced to a scanning position by the second scanning unit 125, the controller 140 transmits a turn-on signal (XLAMP) to a lighting control unit 1260. While the turn-on signal (XLAMP) is transmitted, the lighting control unit 1260 controls the light source unit 1250 to be continuously turned on during a document scanning period to irradiate the document (not shown) with the light. Moreover, the lighting control unit 1260 controls the light source unit 1250 to be turned on and off alternately in a repetitive manner during the period other than the scanning period.

Reflected light reflected on the document is collected by the condenser lens into the sensor chips 1251, and scanned as image information. The image information scanned by each of the sensor chips 1251 is amplified by the respective amplifier circuits 1252, and then converted into digital image information by the respective A/D converters 1253.

With respect to the digital image information, the black correction unit 1254 removes offset components thereof, and the white correction unit 1255 performs shading correction thereof. The resulting digital image information is input to the image processing unit 1256 to subject it to interline correction, etc., and then stored temporally in the frame memory 1257.

Thereafter, the output control circuit 1258 converts the digital image information into data in a format that can be accepted by the main control unit 160, and then output to the main control unit 160 through the I/F circuit 1259.

The controller 140 is configured to output a timing signal (XFGATE, XSHGATE, etc.) notifying timing at which the leading end of the document reaches a scanning position of the second scanning unit 125 (image data after that timing is treated as effective data), a light source turn-on signal (XLAMP), power supply, etc.

The functions of the black correction unit 1254, the white correction unit 1255, the image processing unit 1256, the frame memory 1257, the output control circuit 1258, and the lighting control unit 1260 are integrated in an application specific integrated circuit (ASIC). Thus, the black correction unit 1254, the white correction unit 1255, the image processing unit 1256, the frame memory 1257, and the output control circuit 1258 can perform, to conform to the timing at which the LED is turned on and off, processing corresponding thereto.

Figure 5:
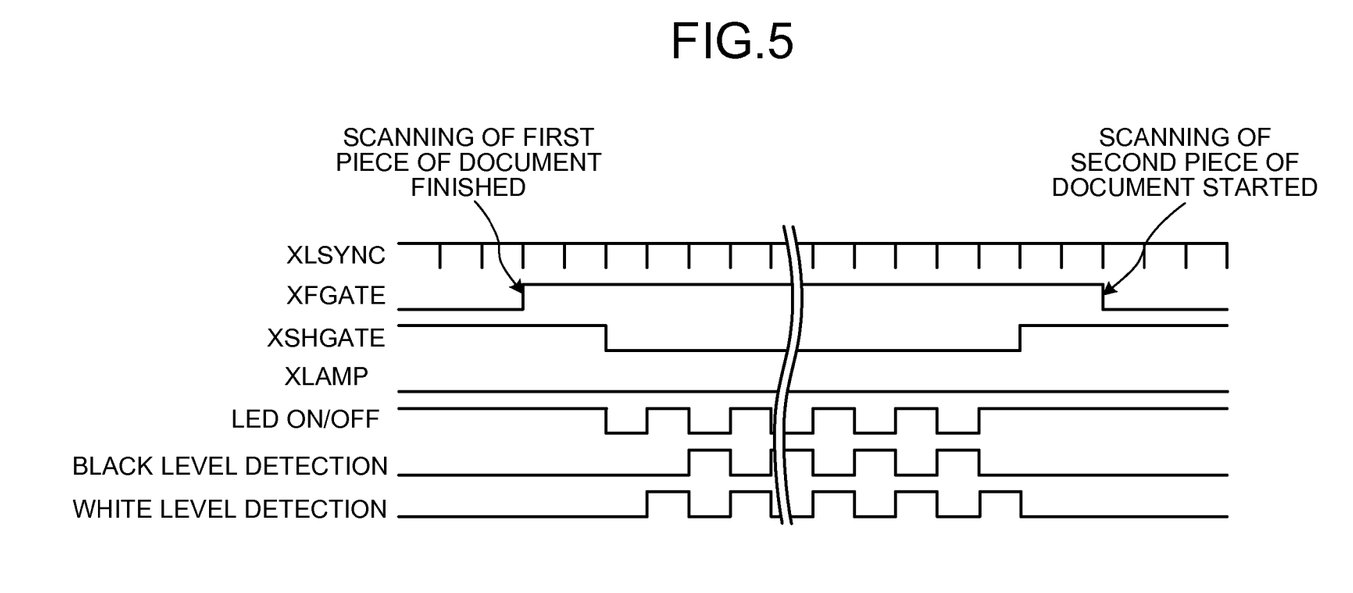
FIG. 5 is a diagram (timing chart) explaining a case in which a light source unit is turned on and off alternately in a repetitive manner.

FIG. 5 is a timing chart of a case in which the light source unit 1250 is turned on and off alternately in a repetitive manner.

In the timing chart of FIG. 5, an LED is used as a light source, and the lighting duty is 100%, as an example. The description of each signal is as follows.

XLSYNC is a synchronizing signal of one line, and is "L" during a period corresponding to several pixels in the head of each line.

XFGATE is a signal indicating an effective image range in the sub-scanning direction, and the effective image range is represented by an "L" period.

XSHGATE is a signal indicating a white level detection period in the sub-scanning direction, and the white level detection range is represented by an "L" period.

XLAMP is a light source turn-on signal notified to the lighting control unit 1260 from the controller 140, and a light source lighting period is represented by "L".

An LED on/off signal defines turning on with "H", and turning off with "L", during a period when XLAMP is "L". During a period when XLAMP is "H", the LED is not turned on.

During the document scanning period (XFGATE is "L" in FIG. 5), the LED is turned on "H" continuously.

During the white level detection period (XSHGATE is "L" in FIG. 5) outside the document scanning period, the LED is turned on (LED on/off signal is "H") and off (LED on/off signal is "L") alternately line by line in a repetitive manner. Then, while the LED is turned on in such a period, a white level for shading correction is detected ("H" at this time), and while the LED is turned off, a black level for black correction is detected ("L" at this time).

In FIG. 5, triggered by switching of XSHGATE to "L", the LED is controlled to be turned on and off alternately in a repetitive manner. However, it is also possible to control the LED to be turned on and off alternately in a repetitive manner based on a different signal (XFGATE is switched to "H", for example).

The black correction unit 1254 and the white correction unit 1255 perform control so that pixel values (effective pixel data) of each pixel and obtained at different positions in the sub-scanning direction are added during the period in which the LED is controlled to be turned on and off alternately in a repetitive manner. Then, after the period during which the LED is controlled to be turned on and off alternately in a repetitive manner is finished, the addition data is divided by the number of addition lines, and average values of the pixels and in the sub-scanning direction are calculated to generate reference black data for black correction, and shading data.

Figure 6:
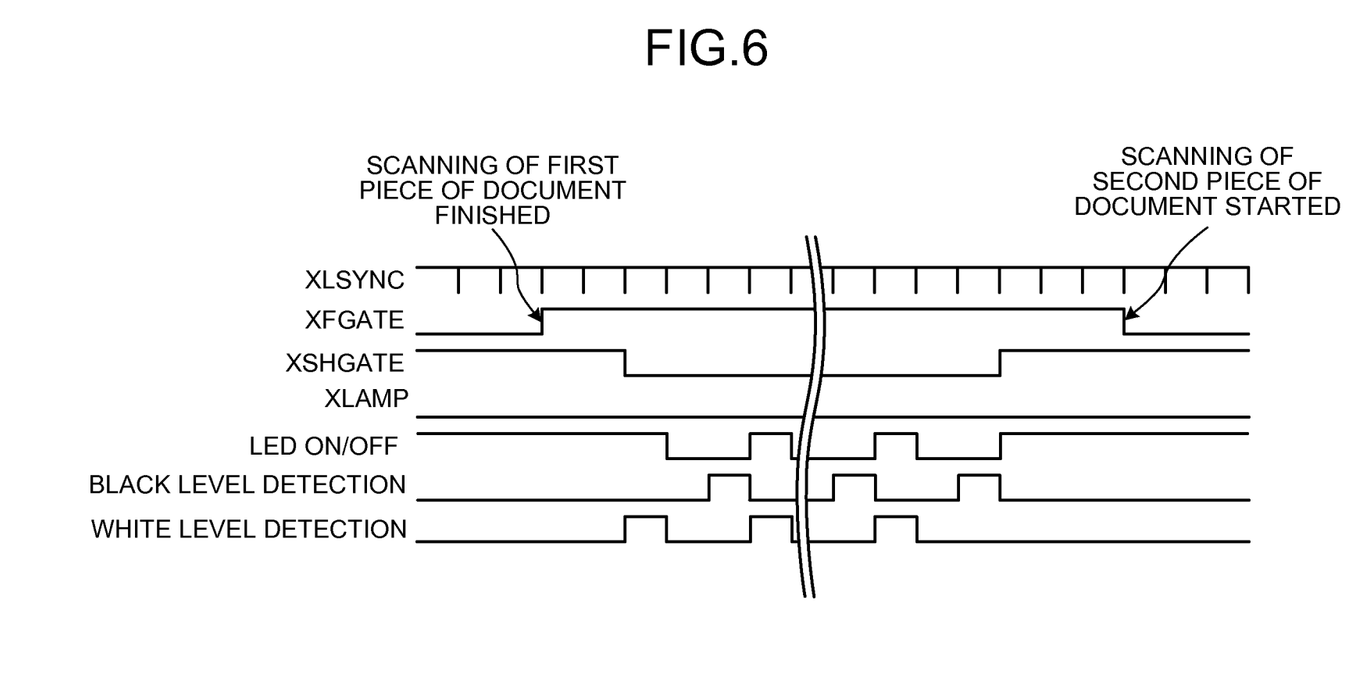
FIG. 6 is a diagram (timing chart) explaining a case in which a light source unit is turned on and off alternately in a repetitive manner (the lighting period and the non-lighting period are set arbitrarily)

FIG. 6 is a timing chart of a case in which the light source unit 1250 is turned on and off alternately in a repetitive manner (the lighting period and the non-lighting period are set arbitrarily).

In FIG. 6, during the period in which the LED is turned on and off alternately in a repetitive manner, two lines are allocated to the non-lighting period, and one line is allocated to the lighting period. The black level detection period is set to one line that is the second half of the non-lighting period. Thus, the measure against LED persistence, etc. can be taken. Note that the assert timing of the LED non-lighting period, the LED lighting period, and the black level detection period can be changed arbitrarily by register settings of the ASIC.

Figure 7:
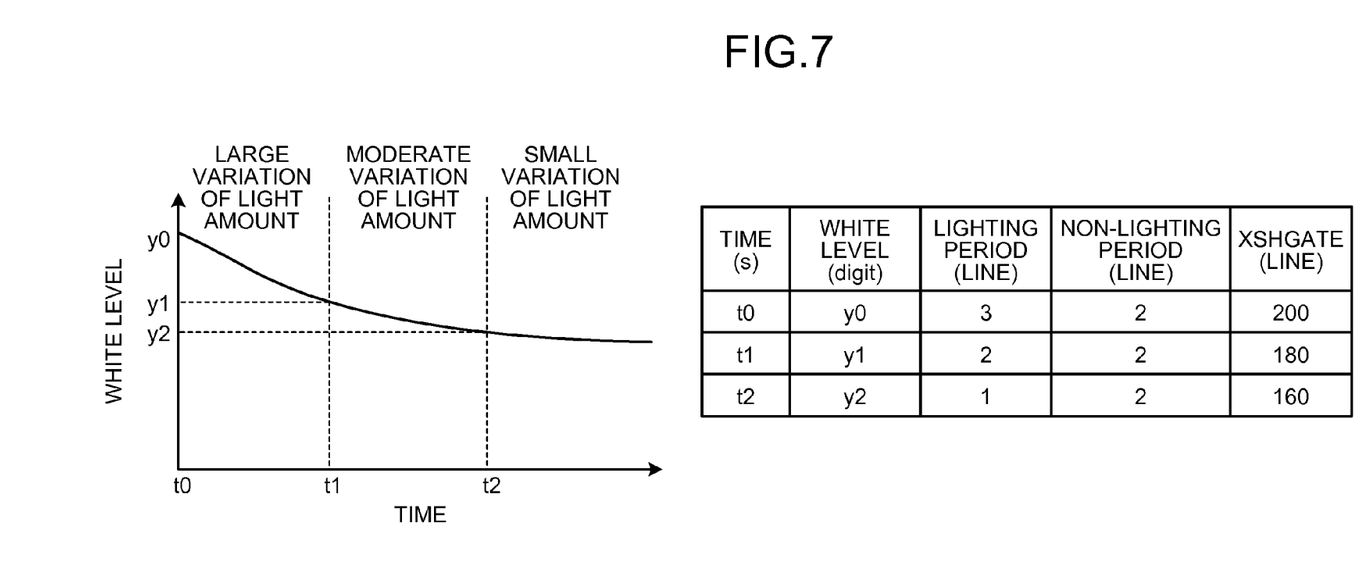
FIG. 7 is a diagram explaining a case in which turning on and off are alternately performed in a repetitive manner (the lighting period and the non-lighting period are set arbitrarily)

FIG. 7 illustrates variation of white level relative to time (left graph), and a look-up table of lighting and non-lighting periods, and XSHGATE period associated with each threshold of white level.

The left graph in FIG. 7 illustrates variation of white level during one job. Although the detected white level significantly decreases immediately after the LED is tuned on (t0→t1), the variation of white level becomes smaller with time after the LED is turned on (t1→t2). The LED non-lighting period, the LED lighting period, and the XSHGATE period are changed depending on such variation of light amount and in the period other than the scanning period.

In the example illustrated in FIG. 7, as initial values (t0), the XSHGATE period is set to 200 lines, the lighting period is set to three lines, and the non-lighting period is set to two lines. In observation of white level (light amount variation), when the observed white level becomes lower than a threshold y1, the XSHGATE period is set to 180 lines, the lighting period is set to two line, and the non-lighting period is set to two lines, referring to the look-up table. When the observed white level becomes lower than a threshold y2, the XSHGATE period is set to 160 lines, the lighting period is set to one line, and the non-lighting period is set to two lines.

In this manner, in the initial term of a job in which variation of light amount is large, the lighting period is prolonged (non-lighting period is shortened) to prolong the white level scanning period, which makes it possible to generate accurate shading data.

By contrast, once the variation of light amount is stabilized, accurate shading data can be generated in the small number of lines. Therefore, the lighting period can be shortened (non-lighting period is prolonged) and, at the same time, the XSHGATE period can be also shortened, which makes it possible to shorten paper interval time and thus improve productivity. Note that the LED non-lighting period, and the LED lighting period can be changed depending not on variation of white level, but on the number of scanned pieces of paper.

Figure 8:
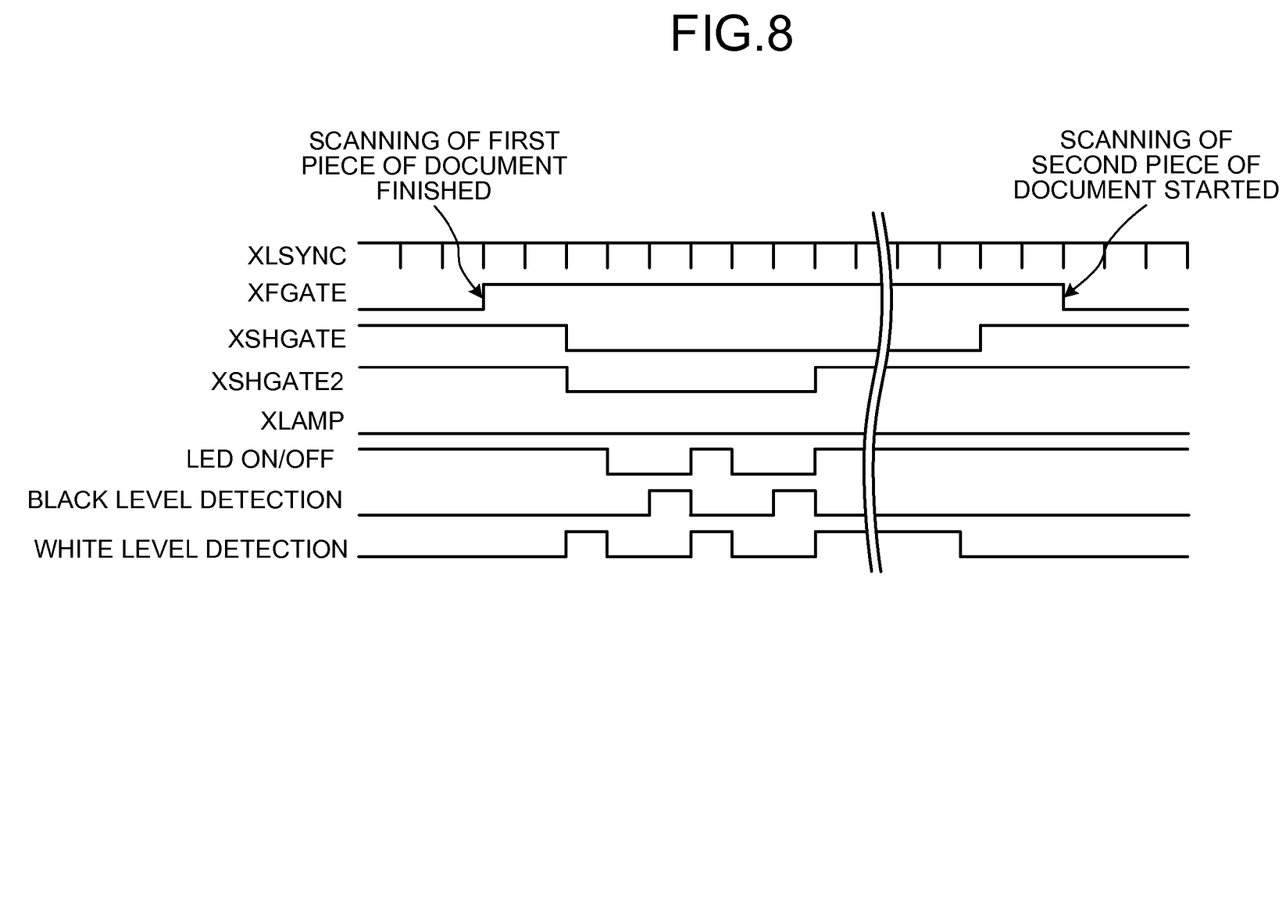
FIG. 8 is a diagram (timing chart) explaining a case in which the period during which turning on and off are alternately performed in a repetitive manner is controlled in units of a line cycle.

FIG. 8 is a timing chart of a case in which the period during which turning on and off are alternately performed in a repetitive manner is controlled in units of a line cycle.

The XSHGATE2 is a signal indicating a period during which the LED is turned on and off alternately in a repetitive manner. During the XSHGATE2 period in the XSHGATE period, the LED is turned on and off alternately in a repetitive manner. While the LED is turned on, a white level is detected for shading correction, and while the LED is turned off, a black level is detected for black correction. During the period other than the XSHGATE2 period in the XSHGATE period, a white level is detected for shading correction. In this manner, it is possible to reduce the reference black level detection range to the minimum necessary and increase the number of lines used to generate shading data, thus reducing influence of dust in a configuration in which a white roller is used to obtain shading data. Note that, in the configuration, the period during which a white level for shading correction is detected can be limited to the period other than the XSHGATE2 period (to simplify functions).

Figure 9:
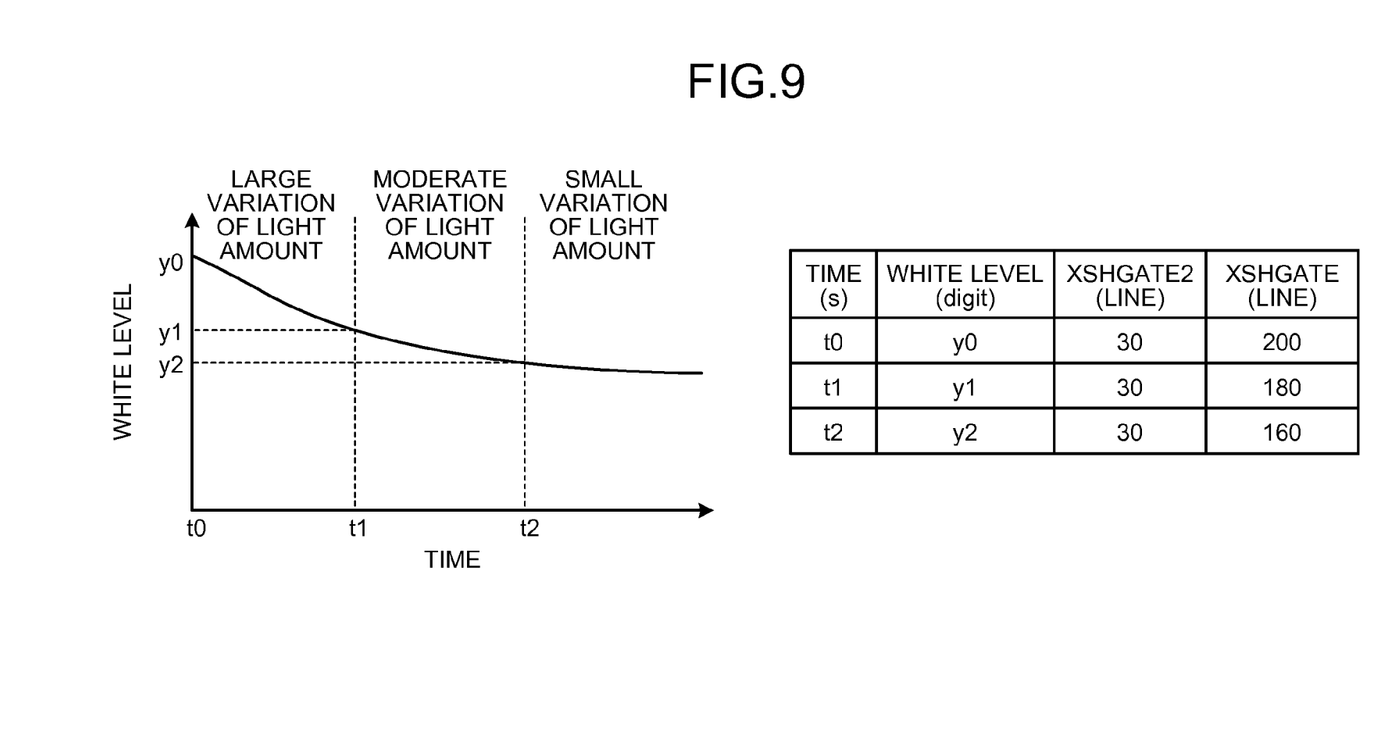
FIG. 9 is a diagram explaining a case in which the period during which turning on and off are alternately performed in a repetitive manner is controlled in units of a line cycle.

FIG. 9 illustrates variation of white level relative to time (left graph), and a look-up table of the number of assert lines of the XSHGATE2 period associated with each threshold of white level (right diagram). The left graph in FIG. 9 illustrates variation of white level during one job. Although the detected white level significantly decreases immediately after the LED is tuned on (t0→t1), the variation of white level becomes small with time after the LED is turned on (t1→t2). The XSHGATE period is shortened, in accordance with the variation of light amount, while the number of lines of the XSHGATE2 period is maintained.

In the example illustrated in FIG. 9, as initial values (t0), the XSHGATE2 period is set to 30 lines, and the XSHGATE period is set to 200 lines. When a white level becomes lower than a threshold y1, the XSHGATE period is set to 180 lines, referring to the look-up table, and when a white level becomes lower than a threshold y2, the XSHGATE period is set to 160 lines. That is, only the XSHGATE period is shortened.

In this manner, in the initial term of a job in which variation of light amount is large, the XSHGATE period is prolonged to prolong the white level scanning period, which makes it possible to generate accurate shading data.

Once the variation of light amount is stabilized, accurate shading data can be generated in the small number of lines. Therefore, the XSHGATE period is shortened, which makes it possible to shorten paper interval time and improve productivity. Note that the XSHGATE period can be changed depending not on variation of white level, but on the number of scanned pieces of paper.

Figure 10:
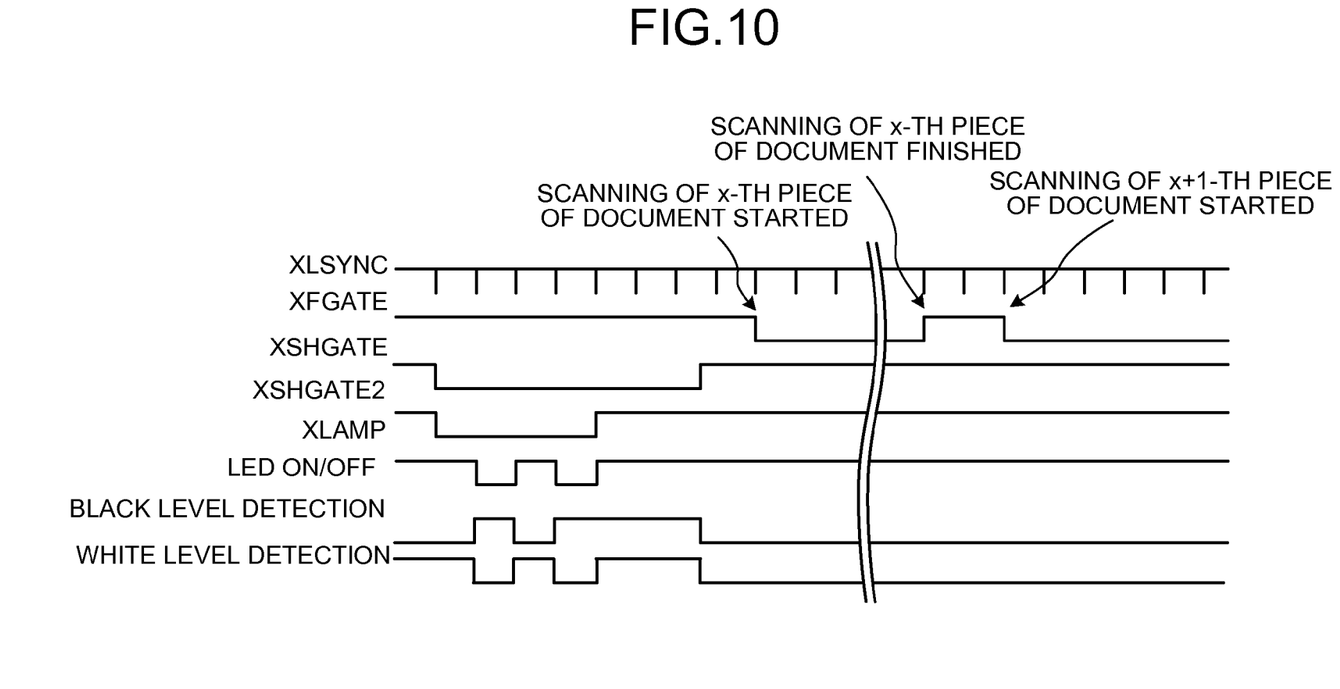
FIG. 10 is a diagram (timing chart) explaining a case in which the paper interval during which the control of alternately performing turning on and off in a repetitive manner is performed and the paper interval during which such control is not performed are alternately repeated.

FIG. 10 is a timing chart of a case in which a paper interval during which the control of alternately performing turning on and off in a repetitive manner is performed and a paper interval during which such control is not performed are alternately repeated.

In the configuration in which a paper interval during which the control of alternately performing turning on and off in a repetitive manner is performed and a paper interval during which such control is not performed are alternately repeated, a paper interval during which reference black data and shading data are not generated is provided, which makes it possible to further shorten paper interval time and thus improve productivity, as compared with configurations described with reference to FIG. 5 and FIG. 6.

Figure 11:
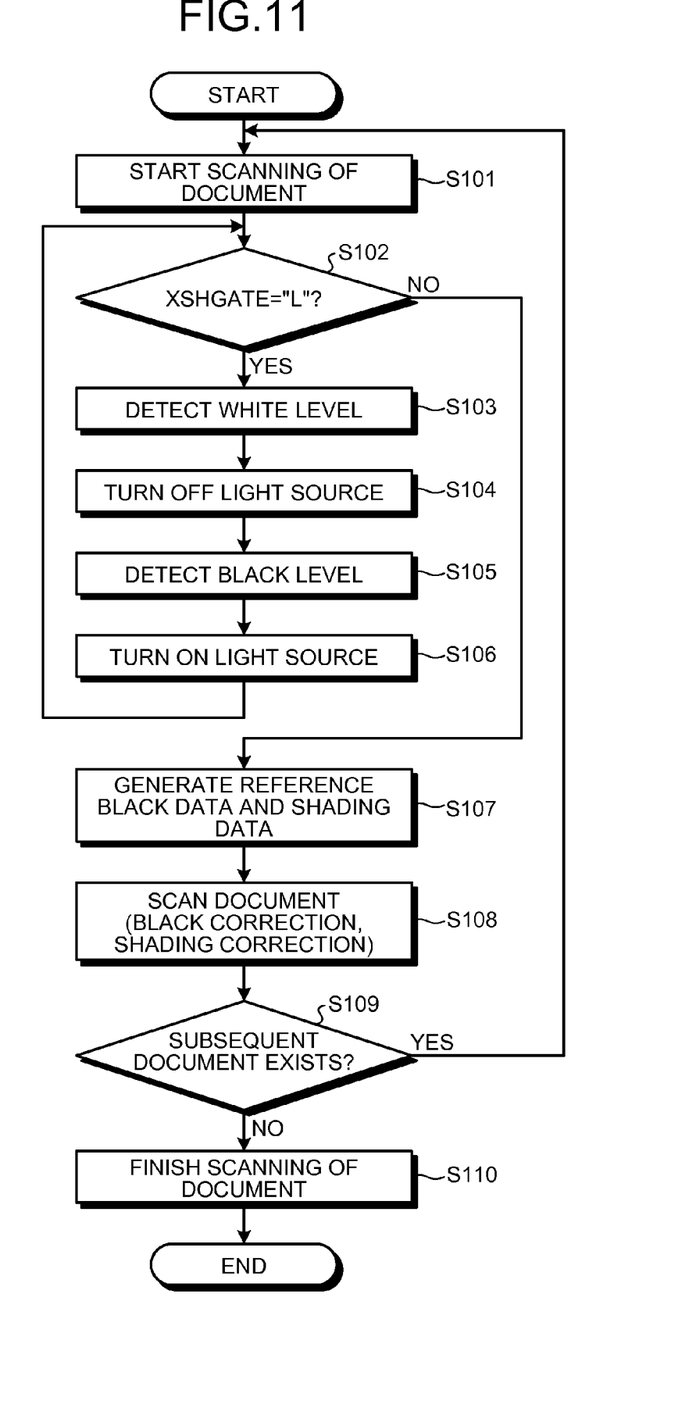
FIG. 11 is a flowchart illustrating an example of a outline of control in scanning a document.

Subsequently, the generation of reference black data and the generation of shading data for shading correction in the period other than the document scanning period are described with reference to a flowchart of FIG. 11 illustrating an example of an outline of control in scanning a document.

When the scanning of a document is started (S101) (the LED is turned on, here) and a period other than the document scanning period comes (XSHGATE becomes "L") (Yes at S102), the LED is then alternately turned off "H" and on "L" line by line in a repetitive manner during this period (S104 and S106). Here, each of the sensor chips 1251 outputs black level data when the LED is turned off, while it outputs white level data obtained by scanning the white reference member when the LED is turned on, through the corresponding amplifier circuit 1252 and A/D converter 1253.

Next, the black correction unit 1254 detects the input black level data (S105) and the white correction unit 1255 detects the white level data (S103).

When it is determined "No" at 5102, black data and shading data are generated in the black correction unit 1254 and the white correction unit 1255, respectively (S107), by adding pixel values of each of pixels, arranged in the main-scanning direction, and obtained at different position in the sub-scanning direction (at a plurality of lines) during the period in which the LED is controlled to be turned on and off alternately in a repetitive manner, and dividing the addition data by the number of addition lines to calculate average values of pixels and in the sub-scanning direction after the period during which the LED is controlled to be turned on and off alternately in a repetitive manner is finished.

Thereafter, similarly to the conventional method, the scanning of the document involving black correction and shading correction is performed (S108), and the process returns, when there is a following document (Yes at S109), to S101 to start the scanning of the following document and perform the subsequent control. When there is no following document (No at S109), the scanning of documents is finished (S110).

When the light source is turned on and off repeatedly, and the white level detection and the black level detection are repeated, during the paper interval period, timings for these are as described above. In the example of the outline of control in FIG. 11, assume that the XSHGATE is "L" at S101.

As described above, in the image scanner of the present embodiment, a light source is turned on and off repeatedly in units of given numbers of lines, which makes it unnecessary to secure light amount stabilizing time after the light source is turned on again in the image scanner using an image sensor that includes no OPB pixel. Thus, it becomes possible to shorten paper interval time while generating reference black data in the paper interval.

In the embodiment, a copying machine is exemplified as an image forming apparatus having a function of an image scanner. However, the function can be applied to any image forming apparatus such as a multifunction peripheral (MFP), which has at least two functions among a copy function, a printer function, a scanner function, and a facsimile function, a scanner and a facsimile.

According to the embodiment, in the image scanner using an image sensor that includes no OPB pixel, a light source is turned on and off repeatedly in units of given numbers of lines, which makes it unnecessary to secure light amount stabilization time after the light source is turned on again. Therefore, the paper interval time can be shortened while reference black data is generated in a paper interval.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image scanner, comprising:
a light source configured to irradiate a document with light;
an image sensor configured to photo-electrically convert reflected light from the document irradiated with light by the light source;
an A/D converter configured to convert an analog image signal output from the image sensor into a digital signal to output the digital signal;
a lighting control unit configured to adjust, in a period other than a document scanning period, a lighting period of the light source so that the light source is turned on and off alternately in a repetitive manner in units of a line cycle, wherein the lighting control unit is configured to perform control so that the lighting period and the non-lighting period that are predetermined arbitrarily in units of a line are repeated periodically in the period other than the document scanning period;
a black correction unit configured to generate reference black data used for black correction based on effective pixel data in a light source non-lighting period in the period other than the document scanning period; and
a white correction unit configured to generate shading data used for shading correction based on effective pixel data in a light source lighting period in the period other than the document scanning period.

2. The image scanner according to claim 1, wherein the image sensor includes a plurality of sensor chips configured to produce photoelectric conversion.

3. The image scanner according to claim 1, wherein the white correction unit is configured to average generated shading data for each of groups of pixels set arbitrarily, and configured to calculate a maximum value thereof to calculate variation of light amount.

4. The image scanner according to claim 1, wherein the lighting control unit is configured to change the lighting period and the non-lighting period of the light source depending on number of documents having been scanned.

5. The image scanner according to claim 1, wherein the lighting control unit is configured to change the lighting period and the non-lighting period of the light source with reference to a look-up table defining a lighting period and a non-lighting period corresponding to a current white level, depending on variation of light amount calculated by the white collection unit.

6. The image scanner according to claim 1, wherein the lighting control unit is configured to set arbitrarily, in units of a line, a period during which the light source is turned on and off repeatedly in the period other than the document scanning period.

7. The image scanner according to claim 1, wherein the lighting control unit is configured to change, depending on number of documents having been scanned, a period during which the light source is turned on and off repeatedly in the period other than the document scanning period.

8. The image scanner according to claim 1, wherein the lighting control unit is configured to change a period during which the light source is turned on and off repeatedly in the period other than the document scanning period, with reference to a look-up table defining a period during which the light source is turned on and off repeatedly and a period during which a white level is detected for shading correction, corresponding to a current white level, depending on variation of light amount calculated by the white collection unit.

9. An auto document feeder comprising an image scanner comprising:
a light source configured to irradiate a document with light;
an image sensor configured to photo-electrically convert reflected light from the document irradiated with light by the light source;
an A/D converter configured to convert an analog image signal output from the image sensor into a digital signal to output the digital signal;
a lighting control unit configured to adjust, in a period other than a document scanning period, a lighting period of the light source so that the light source is turned on and off alternately in a repetitive manner in units of a line cycle, wherein the lighting control unit is configured to perform control so that the lighting period and the non-lighting period that are predetermined arbitrarily in units of a line are repeated periodically in the period other than the document scanning period;
a black correction unit configured to generate reference black data used for black correction based on effective pixel data in a light source non-lighting period in the period other than the document scanning period; and a white correction unit configured to generate shading data used for shading correction based on effective pixel data in a light source lighting period in the period other than the document scanning period.

10. The auto document feeder according to claim 9, wherein the white correction unit is configured to average generated shading data for each of groups of pixels set arbitrarily, and calculates a maximum value thereof to calculate variation of light amount.

11. The auto document feeder according to claim 9, wherein the lighting control unit is configured to change the lighting period and the non-lighting period of the light source depending on number of documents having been scanned.

12. The auto document feeder according to claim 9, wherein the lighting control unit is configured to change the lighting period and the non-lighting period of the light source with reference to a look-up table defining a lighting period and a non-lighting period corresponding to a current white level, depending on variation of light amount calculated by the white collection unit.

13. The auto document feeder according to claim 9, wherein the lighting control unit is configured to set arbitrarily, in units of a line, a period during which the light source is turned on and off repeatedly in the period other than the document scanning period.

14. The auto document feeder according to claim 9, wherein the lighting control unit is configured to change, depending on number of documents having been scanned, a period during which the light source is turned on and off repeatedly in the period other than the document scanning period.

15. The auto document feeder according to claim 9, wherein the lighting control unit is configured to change a period during which the light source is turned on and off repeatedly in the period other than the document scanning period, with reference to a look-up table defining a period during which the light source is turned on and off repeatedly and a period during which a white level is detected for shading correction, corresponding to a current white level, depending on variation of light amount calculated by the white collection unit.

16. An image forming apparatus comprising an image scanner comprising:

a light source configured to irradiate a document with light;

an image sensor configured to photo-electrically convert reflected light from the document irradiated with light by the light source;

an A/D converter configured to convert an analog image signal output from the image sensor into a digital signal to output the digital signal;

a lighting control unit configured to adjust, in a period other than a document scanning period, a lighting period of the light source so that the light source is turned on and off alternately in a repetitive manner in units of a line cycle, wherein the lighting control unit is configured to perform control so that the lighting period and the non-lighting period that are predetermined arbitrarily in units of a line are repeated periodically in the period other than the document scanning period;

a black correction unit configured to generate reference black data used for black correction based on effective pixel data in a light source non-lighting period in the period other than the document scanning period; and a white correction unit configured to generate shading data used for shading correction based on effective pixel data in a light source lighting period in the period other than the document scanning period.

\* \* \* \* \*